(12) United States Patent
Richter

(10) Patent No.: US 8,474,878 B2
(45) Date of Patent: Jul. 2, 2013

(54) SECURING DEVICE OF A FLUID LINE CONNECTION

(75) Inventor: Hans Jurgen Richter, Marsberg (DE)

(73) Assignee: Centrotherm Systemtechnik GmbH, Brilon (DE)

( * ) Notice: Subject to any disclaimer, the term of this patent is extended or adjusted under 35 U.S.C. 154(b) by 192 days.

(21) Appl. No.: 13/007,797

(22) Filed: Jan. 17, 2011

(65) Prior Publication Data

US 2011/0193341 A1  Aug. 11, 2011

(30) Foreign Application Priority Data

Feb. 5, 2010  (EP) ..................................... 10152807

(51) Int. Cl.
*F16L 21/06* (2006.01)
(52) U.S. Cl.
USPC ............................................ 285/320; 285/319
(58) Field of Classification Search
USPC ................ 285/403, 305, 320, 87, 319; 24/22, 24/23 R, 23 W
See application file for complete search history.

(56) References Cited

U.S. PATENT DOCUMENTS

| | | | | |
|---|---|---|---|---|
| 1,592,831 A * | 7/1926 | Lake | ............................. | 411/197 |
| 2,143,177 A * | 1/1939 | Whyte | ............................ | 403/105 |
| 2,503,854 A * | 4/1950 | Trainor | .......................... | 403/223 |
| 2,536,602 A * | 1/1951 | Goett | ............................ | 285/305 |
| 2,642,108 A * | 6/1953 | Geistert | ........................ | 411/130 |
| 3,129,476 A * | 4/1964 | Sindlinger | .................... | 285/403 |
| 3,874,713 A * | 4/1975 | Myers | ............................ | 285/340 |
| 3,989,394 A * | 11/1976 | Ellis | ................................ | 403/46 |
| 4,340,244 A * | 7/1982 | Scott | ................................. | 285/8 |
| 4,377,301 A * | 3/1983 | Craig et al. | ..................... | 285/62 |
| 4,870,988 A * | 10/1989 | Hood et al. | .................... | 137/343 |
| 5,350,203 A * | 9/1994 | McNaughton et al. | ....... | 285/319 |
| 6,769,652 B1* | 8/2004 | Capan et al. | .................... | 248/65 |
| 2002/0084652 A1* | 7/2002 | Halbrock et al. | ............. | 285/305 |
| 2006/0113792 A1* | 6/2006 | Weithorn | ..................... | 285/305 |

FOREIGN PATENT DOCUMENTS

| | | |
|---|---|---|
| EP | 1416214 | 5/2004 |
| GB | 1311046 | 3/1973 |
| GB | 1361404 | 7/1974 |
| JP | 02278095 A * | 11/1990 |
| WO | 03083345 | 10/2003 |

OTHER PUBLICATIONS (For EP 10 15 2807), European Search Report and Written Opinion dated Sep. 20, 2010.

* cited by examiner

*Primary Examiner* — James Hewitt
(74) *Attorney, Agent, or Firm* — Rankin Hill & Clark LLP

(57) ABSTRACT

A securing device for axially connecting a sleeve-shaped end section of a first fluid line part to an end section, which is designed as a pointed end, of a second fluid line part includes a clamping body which is of annular design and has a passage opening for insertion of the second fluid line part, at least one retaining element of a hook-shaped design, and at least one spacer of web-shaped design, wherein the at least one retaining element and the at least one spacer are both integrally formed with the clamping body and extend in the same axial direction.

5 Claims, 4 Drawing Sheets

000
SECURING DEVICE OF A FLUID LINE CONNECTION

BACKGROUND

The invention relates to a securing device for axially connecting a sleeve-shaped end section of a first fluid line part to an end section, which is designed as a pointed end, of a second fluid line part. Furthermore, the invention relates to a fluid line connection which has a securing device of this type.

In the context of the invention, the expression "fluid line part" comprises all types of tubular shaped pieces or shaped parts in pipelines, such as, for example, pipes, pipe bends, T pieces, Y pieces, sleeves, U pipes, pipe branches, reducing means or reductions, pipe sockets and the like. Embodiments below which relate to pipes, pipelines and pipe connections should therefore not be understood as being restricted to pipes but rather in general to abovementioned types of fluid line parts and the connections thereof. Similarly, the term "fluid" includes both gases and liquids within the meaning of the invention.

It is generally known to connect end sections of fluid line parts, such as, for example, of pipes, to one another by means of screw, flange, clamping or sleeve connections in order to form a fluid line or pipeline.

In the case of screw connections, the end sections of the pipes or fluid line parts have a thread, as a result of which the end sections of the pipes can be connected securely to one another. However, screw connections of this type to a certain extent restrict the flexibility of laying pipes and, furthermore, require time-consuming installation operations. Screw connections of this type are therefore customarily used only in pipes having small nominal widths, but for nominal pressures of up to several hundred bar.

With greater nominal widths of the pipes or fluid line parts, use can be made of flange connections in order to connect pipe sections tightly, but releasably to one another. For the tightness of the flange connection, the contact pressure of the sealing surfaces against the seal located inbetween is crucial. The contact pressure is generally applied by screws which are plugged through bores in the flange leaves. Said flange leaves or flanges are generally welded to the pipe, this entailing complicated welding operations.

In the case of clamping connections, those end sections of the pipes or fluid line parts which are to be connected are completely surrounded by a clamping body. The clamping body is then drawn together by means of one or more screw connections and thereby wedges in those end sections of the pipes which are to be connected, wherein the region to be clamped together comprises virtually 360° and the surface pressure between the pipe and clamping body is built up uniformly. In this case, the permissible tightening torque of the screws has to be noted in order to obtain the required frictional connection between the clamping body and the pipes such that the tightness of the connection is ensured.

Furthermore, the prior art discloses sleeve connections for the interruption-free connection of pipes or fluid line parts. Sleeve connections of this type are used both for substantially unpressurized pipelines, such as, for example, channel pipes or cable protection pipes, and for pressurized pipelines, such as, for example, lines for gas, exhaust gas, drinking water or waste water. The sleeve connection has a sleeve element which can be produced, for example, by expanding an end section of a pipe. As an alternative, the sleeve element can be designed as a separate coupling sleeve and fitted on the end section of the pipe. Said sleeve connection is also referred to as a "plug-in sleeve connection" in which a free end section of a pipe is plugged into the sleeve element, wherein the free end section of the pipe is generally referred to as the pointed end. In order to seal the sleeve connection, a sealing ring which is inserted in a circumferential groove formed in the inner wall of the sleeve element is customarily provided.

A disadvantage of said sleeve connections is that they are generally not designed to be self-securing and are not designed to withstand tensile forces, and therefore there is the risk, should a tensile loading become effective, of the pipes or fluid line parts which are to be connected sliding apart and releasing the pipe connection or fluid line connection.

In order to prevent this, plug-in sleeve connections are known, in which, in order to secure the pipe connection, an annular clamping element is arranged in a special, encircling recess in front of the sealing ring, the clamping element being pressed against the pointed end under the action of the recess, which becomes narrower towards the sleeve entrance, and, by means of a frictional connection, prevents said pointed end from migrating out of the sleeve. In this case, the clamping ring can be specially roughened or toothed. It is disadvantageous, however, that visual checking of the securing means in the form of the clamping ring is not possible, since the clamping ring is arranged in the interior of the pipe connection between the pipes and checking is possible only if the pipe connection is released.

The use of a clamping element of this type furthermore has the disadvantage that the clamping element does not immediately come into effect but rather only after a certain starting distance, and therefore the tightness of the connection is not always ensured. Also, clamping elements of this type, which are generally of elastic design, withstand only a certain tensile force and are not suitable for relatively large tensile loadings. In particular in the case of pressure-loaded sleeve connections, there is therefore the risk of the sleeve connection becoming released under tensile loading. Furthermore, some countries have strict and prescribed requirements that the sleeve connection must withstand, for example, a tensile loading of several hundred Newtons and a predetermined torque acting on the connection.

There is therefore the need in fluid line connections of this type to provide a securing means which withstands high tensile forces, thus preventing the fluid line parts from sliding apart.

BRIEF DESCRIPTION

The invention is based on the object of providing a solution which, in a structurally simple manner and cost-effectively, provides a simplified and improved securing means to axially connect end sections of fluid line parts and which, furthermore, can easily be fitted and removed and, after fitting, is immediately effective.

This object is achieved according to the invention by a securing device for axially connecting a sleeve-shaped end section of a first fluid line part to an end section, which is designed as a pointed end, of a second fluid line part, wherein the securing device comprises a clamping body which is of annular design and has a passage opening having an internal contour, which is matched to the outside diameter of the second fluid line part, for the insertion of the second fluid line part. At least one retaining element which extends in the axial direction and is of hook-shaped design and is intended for bringing into engagement with the end section of the first fluid line part is integrally formed on the clamping body which is of annular design. Furthermore, at least one spacer which is of web-shaped design and extends in the axial direction is integrally formed on the clamping body, wherein the at least one retaining element which is of hook-shaped design and the at least one spacer which is of annular design extend in the same axial direction. The spacer can be integrally formed, for example, substantially on that side of the clamping body which lies radially opposite the retaining element. However, deviating positionings of the at least one spacer and the use of a plurality of spacers are also conceivable.

The abovementioned object is also achieved according to the invention by a fluid line connection which has a first fluid line part with a sleeve-shaped end section, a second fluid line part with an end section, which is designed as a pointed end, and a securing device. The end section, which is designed as a pointed end, of the second fluid line part can be plugged into the sleeve-shaped end section of the first fluid line part. The outer circumference of the sleeve-shaped end section of the first fluid line part has at least one projection formed at least in sections circumferentially. The securing device comprises a clamping body which is of annular design in the radial direction and has a passage opening which has an internal contour, which is matched to the outside diameter of the second fluid line part, for the insertion of the second fluid line part. In the assembled arrangement of the fluid line connection, the end section of the second fluid line part is plugged into the end section of the first fluid line part, wherein the securing device is pushed over the outer wall of the second fluid line part and is arranged in the vicinity of the end section of the first fluid line part. At least one retaining element which extends in the axial direction and is of hook-shaped design and is intended for engaging behind the projection formed on the end section of the first fluid line part is integrally formed on the clamping body which is of annular design. In the assembled position of the fluid line connection, the at least one retaining element engages behind the projection in such a manner that the clamping body which is of annular design tilts from an inclined or oblique position pointing perpendicularly to the axial direction and bears in a form-fitting manner against the outer wall of the second fluid line part.

Advantageous and expedient refinements and developments of the invention emerge from the corresponding dependent claims.

The invention provides a possibility with which an increase in the tensile strength for fluid line connections, such as, for example, pipe connections, is obtained in a structurally simple manner as a type of plug-in sleeve connection. The securing device serves to rapidly connect end sections of fluid line parts, such as, for example, of pipes. With the aid of the securing device according to the invention, it is now possible not only to produce a fluid line connection or pipe connection which is strong in tension but also to release said connection again in a simple manner. By means of the oblique position of the securing device in the fitted state or in the assembled arrangement, a small degree of clamping or pre-clamping of the clamping body on the second fluid line part is achieved. The effect of said clamping is that the securing device is tilted ever further should the fluid line connection possibly slide apart and therefore ultimately a type of self-locking occurs. The securing device or the fluid line connection can be installed manually without the use of a tool in a time-saving manner. Furthermore, the fluid line connection is not subject to any influence from a fitter or craftsman. Since the connection according to the invention does not use any screws, flanges, clips or the like, a screw tightening torque which has to be kept to does not have to be taken into consideration either. Checking as to whether the fluid line connection has been set up correctly and the securing device has been correctly installed can be carried out by means of simple visual checking. The structural configuration of the securing device in the form of a clip makes it possible for only a single structural element to be required to connect end sections of two fluid line parts, thus enabling material costs to be saved. In addition, simple and more rapid installation is possible, this likewise leading to a reduction in costs. The invention therefore realizes axial securing without the assistance of a multi-part securing means.

In order to increase the clamping action of the securing device on the outer circumference of the second fluid line part, it is expedient for the clamping body—in particular in the assembled position of the fluid line connection—to be arranged with a certain degree of pre-clamping on the second fluid line part. In addition to said certain degree of pre-clamping, the invention makes provision in a refinement for the internal contour of the passage opening of the clamping body to be designed as a sharp edge or as a frictional surface in order to increase the clamping or tilting of the securing device on the outer wall of the fluid line part. For example, given a metallic design of the securing device, the internal contour of the clamping body, which internal contour is designed as a sharp edge, can easily cut into the outer wall of a fluid line part made of, for example, plastic, which additionally increases the clamping action.

Furthermore, it is also conceivable to manufacture the securing device from a plastics material in a simple production process, wherein the internal contour of the passage opening in the clamping body is then designed as a frictional surface or is provided with an additional component serving as a frictional surface.

Furthermore, it is provided, in an alternative refinement of the invention, that the clamping body has a web encircling radially on the outside or running around the outside circumferentially in order to increase the dimensional stability of the securing device and to prevent the clamping body from sliding off and folding over if the end sections of the fluid line parts which are to be connected slide apart under the action of a tensile force.

In a refinement of the fluid line connection according to the invention, it is then furthermore provided that at least one spacer which is of web-shaped design and extends in the axial direction is integrally formed on the clamping body and, in the fitted position of the securing device or in the assembled position of the pipe connection, is supported on the projection of the end section of the first fluid line part, wherein the at least one retaining element and the at least one spacer extend in the same axial direction. However, the spacer and the retaining element do not need to be oriented strictly parallel to each other. In a development, the invention makes provision for the at least one spacer to be integrally formed substantially on that side of the clamping body which lies radially opposite the at least one retaining element. However, it is also conceivable to arrange the spacer at a position deviating therefrom and/or to provide a plurality of spacers. These different refinements ensure that the securing device, in the fitted position thereof or in the assembled arrangement of the fluid line connection, is arranged in a slightly tilted manner on the second fluid line part and bears closely against the outer wall of the second fluid line part.

In a development of the securing device and of the fluid line connection, the invention makes provision for the axial length or extent of the at least one retaining element which is of hook-shaped design to be greater than the axial length or extent of the at least one spacer which is of web-shaped design. This measure additionally supports the clamping or tilting of the securing device on the second fluid line part, wherein, in the fitted position of the securing device, the spacer is supported on the projection of the end section of the first fluid line part while the retaining element which is of hook-shaped design engages behind a projection formed on the end section of the first fluid line part. This can involve the same projection which is formed running around the circumference of the end section, which is of sleeve-shaped design, of the fluid line part. However, it is also conceivable for two projections to be formed on the sleeve-shaped end section in sections on the circumference of the end section and for the arrangement of said projections to correspond to the arrangement of the retaining element and of the spacer.

Furthermore, it is provided, in a refinement of the invention, that the axial width of the projection is greater than the amount of difference between the axial lengths of the at least one retaining element and the at least one spacer. This brings about a controlled oblique position and a certain degree of pre-clamping or tilting of the securing device on the outer wall of the fluid line part.

Finally, in a refinement, the invention makes provision, in the assembled arrangement of the fluid line connection, for the securing device to be arranged with the second fluid line part, on the outer wall thereof, tilted at an angle of between 5° and 10° to the axis running perpendicularly to the axial direction of the fluid line connection. Said angular range ensures an adequate clamping action in order to prevent the fluid line parts from sliding apart. However, it is also conceivable for an angle of less than 5° and an angle of greater than 10° to be able to be used, this, for example, depending, inter alia, on the diameters of the fluid line parts to be connected.

It goes without saying that the features mentioned above and those which have yet to be explained below can be used not only in the respectively stated combination but also in different combinations or on their own without departing from the scope of the present invention. The scope of the invention is defined only by the claims.

Further details, features and advantages of the subject matter of the invention emerge from the description below in conjunction with the drawing in which examples of preferred exemplary embodiments of the invention are illustrated.

DETAILED DESCRIPTION

Figure 1:
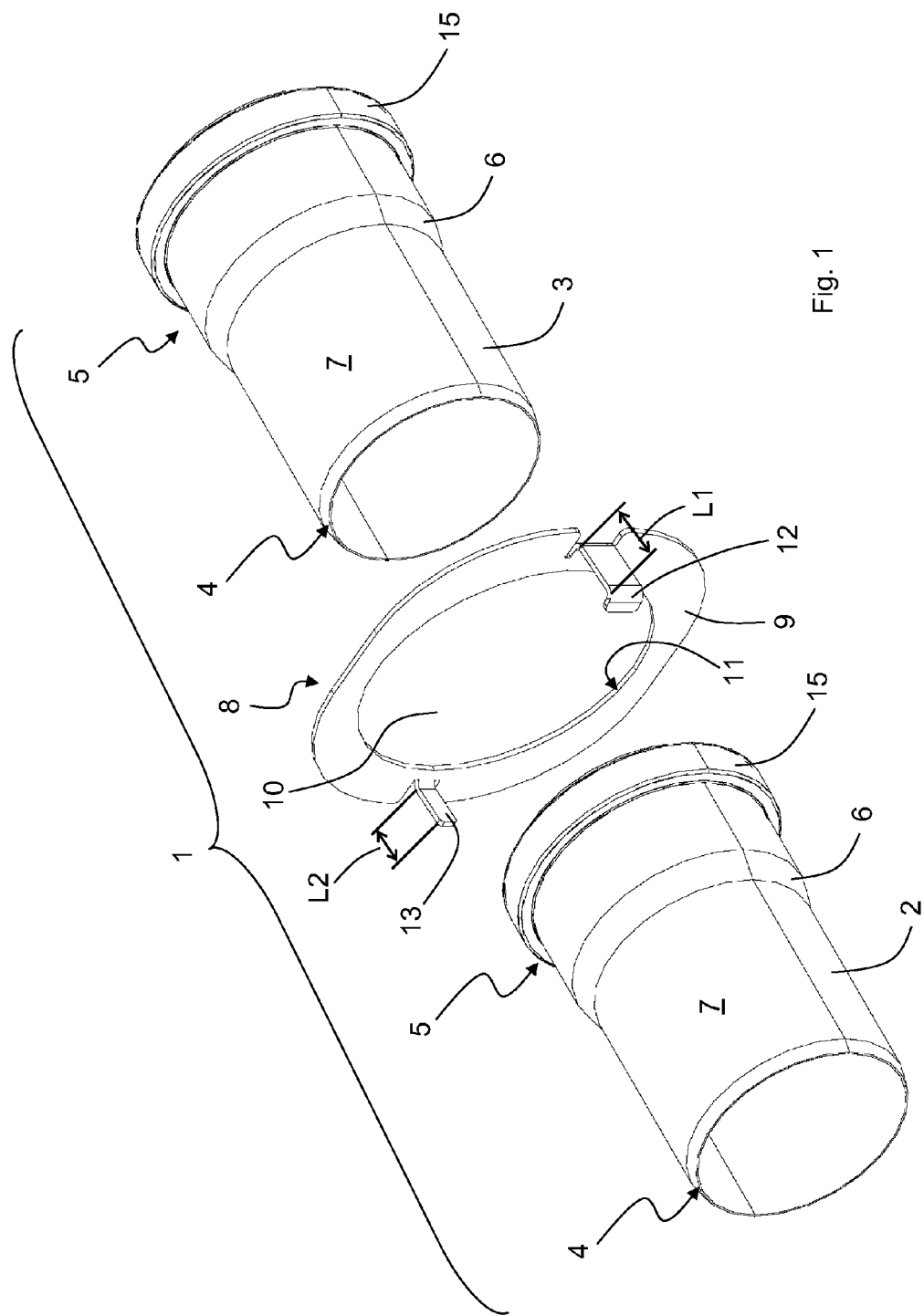
FIG. 1 shows a component illustration of a fluid line connection according to the invention in a perspective view.

A pipe connection is described below in the specific exemplary embodiment of the present invention. It goes without saying that the invention is not restricted only to a pipe connection of this type and a securing device fixing said pipe connection but rather connections of any fluid line parts or shaped parts/shaped pieces, such as, for example, pipes, pipe bends, T pieces, Y pieces, sleeves, U pipes, pipe branches, reducing means or reductions, pipe sockets and the like are included.

FIGS. 1 and 5 to 8 show a pipe connection or pipe connection arrangement which is denoted overall by 1 and constitutes the fluid line connection according to the invention. The fluid line connection 1 or pipe connection 1 comprises a first pipe or fluid line part 2 and a second pipe or fluid line part 3 which, in the exemplary embodiment illustrated, are both of circular-cylindrical design and are composed of plastic. An example of a suitable material for the pipes is polypropylene, wherein a mineral filler (for example glass fiber) can be incorporated into the material. However, it is also conceivable for the pipes to be composed of acrylonitrile-butadiene-styrene (ABS) which is a material having a high surface hardness and good impact strength.

The two pipes 2 and 3 are shaped at the respective end sections 4 and 5 thereof in such a manner that they can be connected to each other in the manner of a sleeve or plug-in sleeve connection. During the connection thereof, the end section 4 of the second pipe 3 is plugged into the end section 5 of the first pipe 2, thus producing the sleeve connection. In terms of the construction thereof, the first pipe 2 and the second pipe 3 are of identical design, and therefore the statements below relating to the first pipe 2 also apply unrestricted to the second pipe 3 and vice versa, i.e. the statements with regard to the second pipe 3 also apply unrestricted to the first pipe 2. A person skilled in the art will recognize that an identical design of the pipes is not absolutely necessary in order to realize the invention. On the contrary, the pipe—pipe connection described below serves merely for the exemplary illustration of the invention, and therefore a connection of a pipe to, for example, a T piece is also conceivable, i.e. a connection of different fluid line parts or shaped pieces.

In order to realize the sleeve connection, both the first pipe 2 and the second pipe 3 each have a first end section 4 which is designed as a pointed end. A second end section 5 of the pipes 2 and 3 lies opposite the first end section 4 and is of sleeve-shaped design, this being able to be carried out, for example, within the scope of the manufacturing process by widening the second end section 5. As an alternative, it is also conceivable for a sleeve element to be pushed onto the second end section 5 of the respective pipe 2 and 3 and to be fixed there.

In the exemplary embodiment illustrated, the inside diameter of the respective sleeve-shaped end sections 5 of the pipes 2 and 3 is dimensioned to be slightly larger than the outside diameter of the pipes 2 and 3. For the expansion to said slightly larger inside diameter, the respective end section 5 comprises a transition region 6 against which, in the assembled arrangement of the pipe connection 1, the end surface of the first end section 4 of the second pipe 3 bears. The second end section 5 of the first pipe 2 therefore has a conical or step- or shoulder-shaped expansion in the form of the transition region 6 in order to receive the first end section 4 of the second pipe 3. In order for the first end section 4 to be able to be plugged or pushed more easily into the sleeve-shaped end section 5, the first end section 4 can be designed to be slightly beveled.

The sealing between the first pipe 2 and the second pipe 3 is carried out by a sealing element which is not illustrated specifically in the figures and is inserted into a circumferential or annular bead formed in the end section 5 of sleeve-shaped design. The sealing element, which is of elastic design, is placed under deformation, after the operation to insert the second pipe 3 into the first pipe 2, in a sealing manner at one end against that end section 4 of the inserted pipe 3 which is designed as a pointed end or against the outer wall 7 of said pipe and presses at the other end into the circumferential or annular bead formed in the sleeve-shaped end section 5. The elastic sealing element used may be an O-ring, a lip seal, a T-shaped profile seal or the like which are inserted in the groove or annular bead which runs on the inside and is formed in the sleeve-shaped end section 5 and, when the pointed end 4 of the pipe 3 to be connected is inserted, come to bear against the outer wall 7 of said pipe where they are compressed.

That end section 5 of the respective pipes 2 and 3 which is of sleeve-shaped design furthermore has a projection which is designed so as to lie on the end side and radially on the outside of the outer wall 7 and, in the exemplary embodiment illustrated, is designed running around the circumference in the form of a collar.

In order to ensure an axial connection of the first and second pipes 2, 3 in a manner strong in tension, according to the invention a securing device 8 is provided, and therefore the pipe connection 1 in the manner of a sleeve connection cannot be pulled apart automatically in the event of tensile loadings. The securing device 8 illustrated in FIGS. 1 and 5 to 8 is illustrated in detail according to a first embodiment in FIG. 2. In this first embodiment, the securing device 8 has a clamping body 9 which is of annular or ring-like design and has a passage opening 10. However, the clamping body 9 does not have to be of annular design. Of sole importance for the function thereof is the passage opening 10 which is matched to the outside diameter of the pipes 2 and 3 and the diameter of which has to be insignificantly or slightly larger than the outside diameter of the pipes 2 and 3. In the case of an 80 mm diameter pipe, for example, the inside diameter of the passage opening 10 would be approximately 80.5 mm if a tolerance of approx. 0.4 mm were taken into consideration in the pipe diameter. Accordingly, the inside diameter of the passage opening is 0.1% to 0.5% larger than the outside diameter of the pipes 2 and 3.

The flat clamping body 9 which is designed in the manner of a plate in the exemplary embodiment illustrated surrounds the passage opening 10 which therefore has an internal contour 11 which is matched to the outside diameter of the two pipes 2 and 3 and has an inside diameter, which is larger by 0.1% to 0.5% in comparison to the outside diameter of the pipes 2 and 3, for the insertion of one of the pipes. It should be noted that, in the case of pipes, the diameter of which is larger than 80 mm, the value falls short of the abovementioned value of 0.1% and is dependent crucially on the system size, i.e. the pipe diameter. The shape of the passage opening 10 and of the internal contour 11 of the clamping body 9 is therefore dimensioned in such a manner that the inside diameter of the passage opening 10 is slightly larger than the outside diameter of the pipes 2 and 3. This makes it possible that, in order to install the securing device 8, the second pipe 3 can just be inserted into the passage opening 10 without a noticeable frictional resistance or that, for the installation, the securing device 8 can be pushed over the outer wall 7 of the pipe 3.

The clamping body 9 furthermore comprises an axial retaining element or retaining element 12. The retaining element 12 is of hook-shaped design, i.e. it has a web section which extends in the axial direction of the pipes 2 and 3 and which is adjoined by a section angled with respect to said web section. A spacer 13 which is of web-shaped design and, like the retaining element 12, extends in the axial direction is integrally formed on that side of the clamping body 9 which lies opposite the retaining element 12, as viewed radially. As can be seen in the figures, the retaining element 12 and the spacer 13 extend in the same axial direction. As is furthermore apparent from FIG. 1, the axial length or extent L1 of the retaining element 12 which is of hook-shaped design is greater than the axial length or extent L2 of the spacer 13 which is of web-shaped design. The first embodiment of the securing device 8 is composed of a metallic material, wherein the internal contour 11 of the passage opening 10 is designed as a sharp edge.

Figure 2:
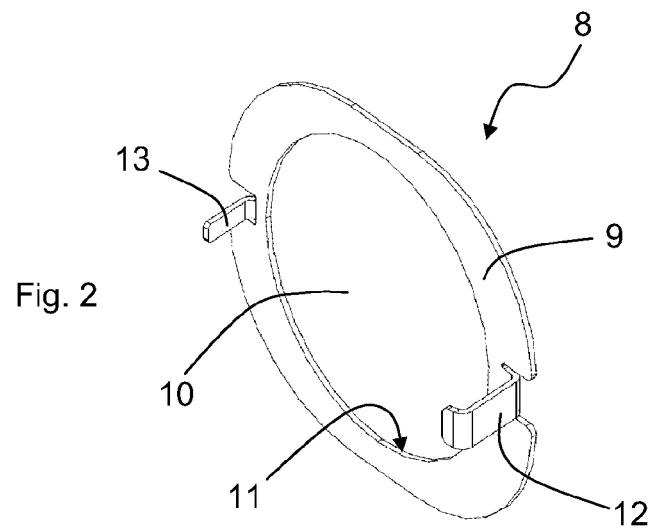
FIG. 2 shows a first embodiment of a securing device according to the invention.
Figure 3:
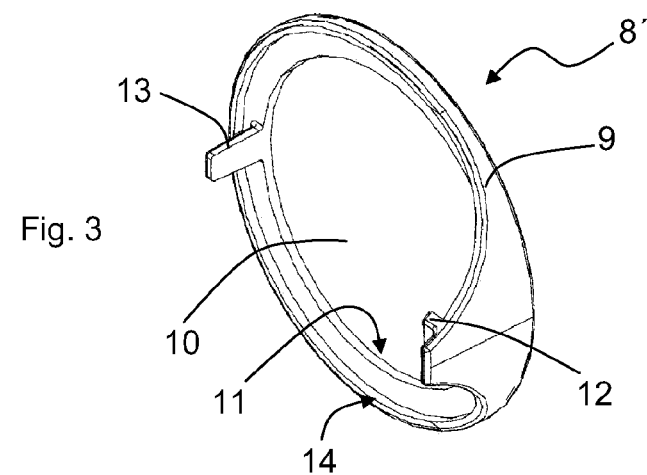
FIG. 3 shows a second embodiment of a securing device according to the invention.
Figure 4:
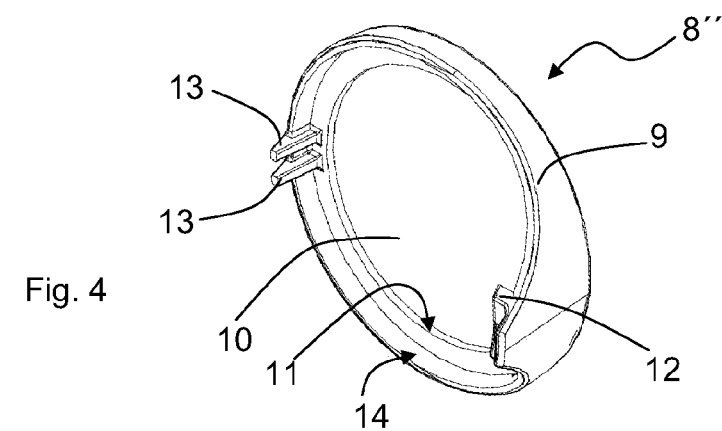
FIG. 4 shows a third embodiment of a securing device according to the invention.

FIGS. 3 and 4 respectively show a second and third embodiment of a securing device 8', 8". The second embodiment of the securing device 8' likewise has a retaining element 12 which is of hook-shaped design and a spacer 13, said retaining element and spacer being arranged on substantially radially opposite sides of the clamping body 9 and extending in the same axial direction. In contrast to the first embodiment of the securing device 8, which embodiment is illustrated in FIG. 2, the securing device 8' illustrated in FIG. 3 is composed of a plastics material. It is expedient in this case for the internal contour 11 of the passage opening 10 to be designed as a frictional surface or to be provided with a component designed as a frictional surface in order to assist and promote the clamping and bonding action between the securing device 8' and the outer wall 7 of the second pipe 3. A further difference between the two embodiments of the securing device 8 and 8' consists in that the clamping body 9 of the securing device 8' has a web 14 encircling radially on the outside. Said web 14 which runs around the outer circumference of the clamping body 10 has approximately twice the width in the axial direction in comparison to the width of the actual clamping body 10. However, in the second embodiment too, the axial length or extent L1 of the retaining element 12 which is of hook-shaped design is greater than the axial length or extent L2 of the spacer 13 which is of web-shaped design.

The third embodiment of a securing device 8", which embodiment is illustrated in FIG. 4, differs from the second embodiment in that, instead of one spacer, two spacers 13 are now arranged substantially on the radially opposite sides of the retaining element 12. The refinement with two spacers 12 increases the stability of the securing device 8" in the assembled arrangement against sliding off from the projection 15 formed on the end section 5.

Figure 5:
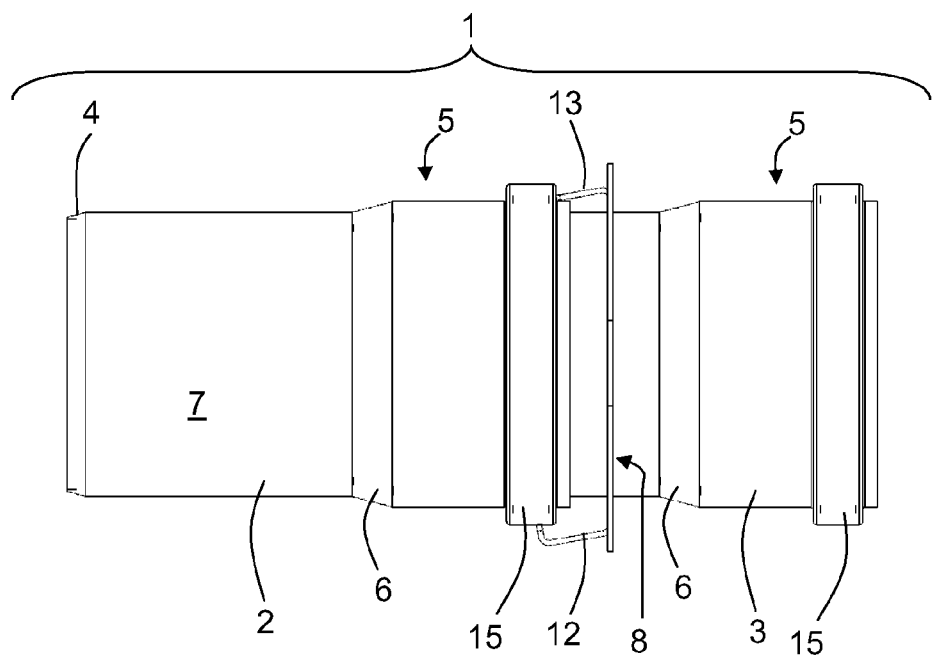
FIG. 5 shows the fluid line connection according to the invention prior to the arrangement of the securing device in the fitted position thereof.
Figure 6:
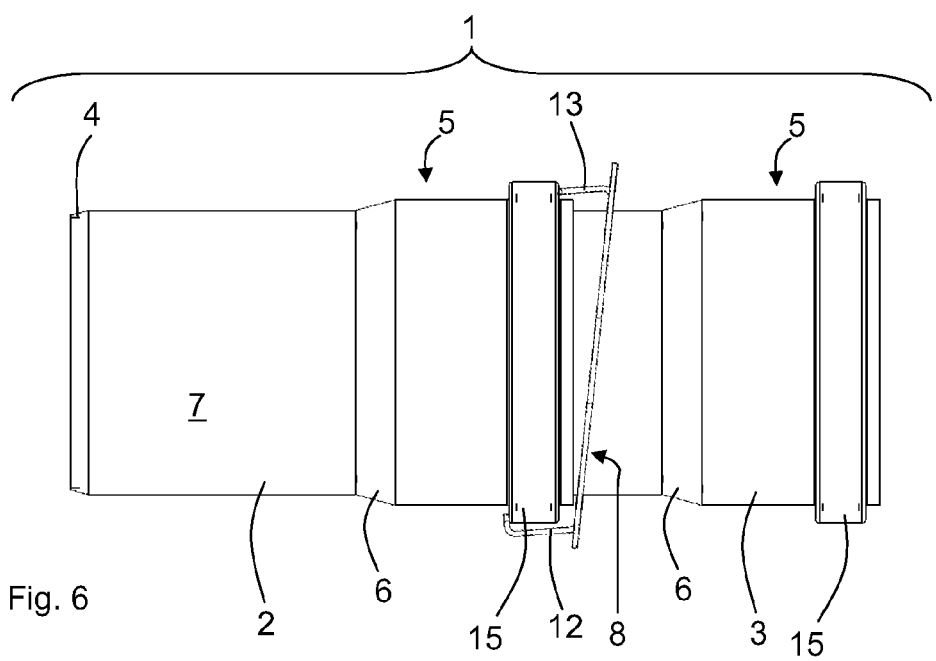
FIG. 6 shows the fluid line connection according to the invention in the assembled arrangement thereof.
Figure 7:
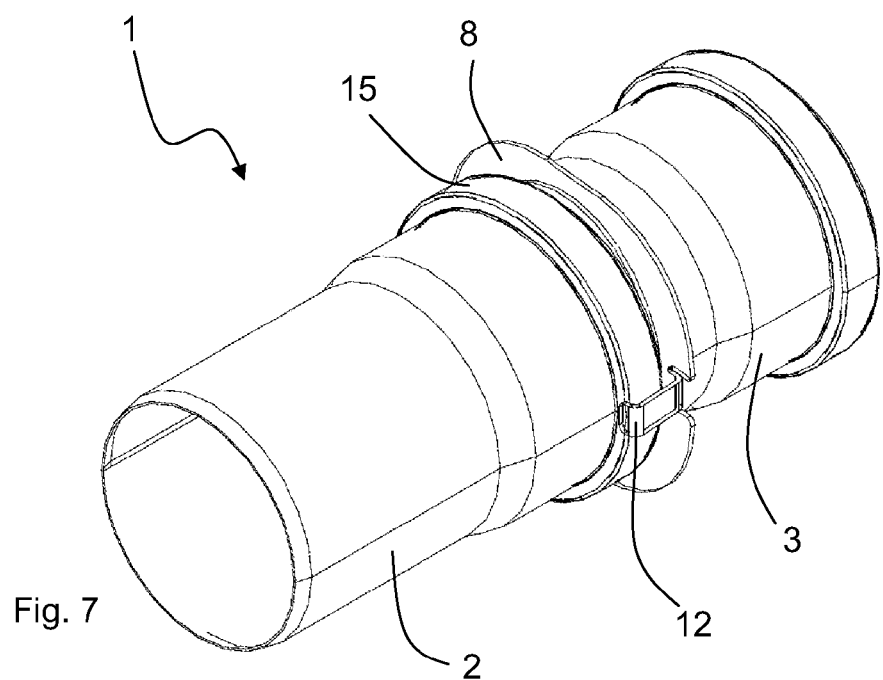
FIG. 7 shows the fluid line connection according to the invention in the assembled position in a perspective view.
Figure 8:
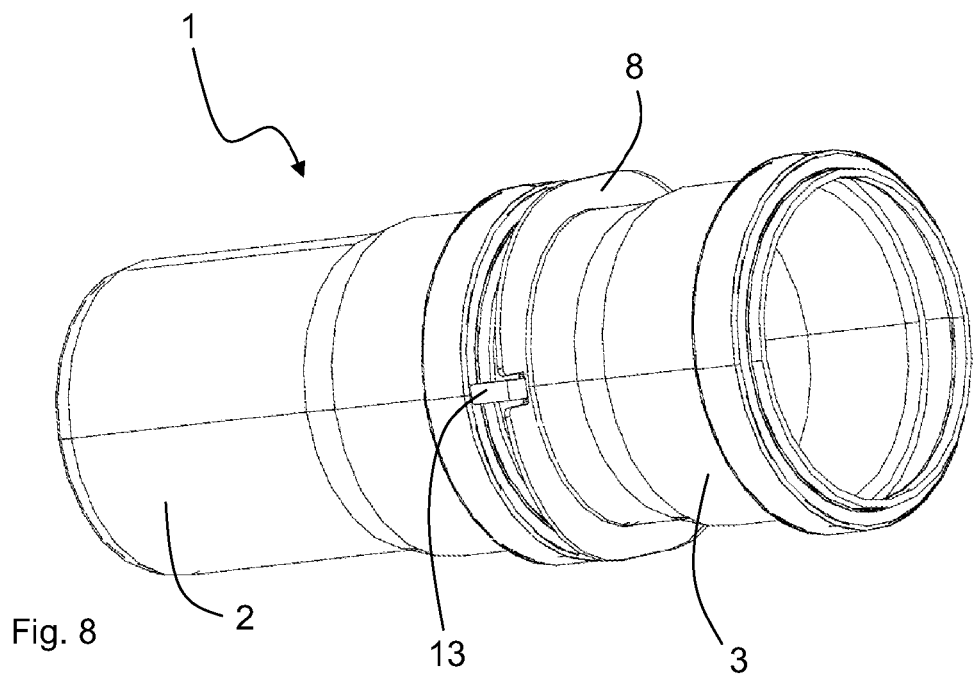
FIG. 8 shows the fluid line connection according to the invention in the assembled position in a perspective view differing from FIG. 7.

The installation of the pipe connection 1 according to the invention is explained in more detail below with reference to FIGS. 1 and 5 to 8. Before the second pipe 3 with the end section 4 which is designed as a pointed end is inserted into that end section 5 of the first pipe 2 which is of sleeve-shaped design, the clamping body 10 with the end section 4 in front is pushed over the outer wall 7 of the second pipe 3. The end section 4 of the second pipe is subsequently plugged into the sleeve-shaped end section 5 of the first pipe 2. Then—as can be seen in FIG. 5—the securing device 8 is moved and pushed on the second pipe 3 in the direction of the end section 5 of the first pipe 2 until the spacer 13 of the securing device 8 is supported on that projection 15 of the first pipe 2 which is of collar-shaped design on the end side of the end section 5. The spacer 13 which is of web-shaped design therefore bears against the end side of the projection 15 of the first pipe 2. During the displacement of the securing device 8 on the outer wall 7 of the second pipe 3, the securing device 8 assumes a substantially perpendicular position to the axial direction of the pipe 3, and therefore, as a result of the slightly larger inside diameter of the passage opening 10, the securing device 8 can be pushed on the outer wall 7 of the second pipe 3 without noticeable resistance. In order to secure the pipe connection 1, i.e. the connection of the first pipe 2 and second pipe 3, the retaining element 12, which is of hook-shaped design, of the securing device 8 is pushed over the projection 15 of the first pipe 2 and engages behind the projection 15. This corresponds to the assembled position which is shown in FIG. 6 and in which the securing device 8 is now no longer arranged perpendicularly to the axial direction of the pipes on the outer wall 7 of the second pipe 3 but rather bears on the second pipe 3 tilted in an inclined or oblique manner such that the internal contour 11 of the passage opening 10 of the securing device 8 bears tightly and in a form-fitting manner without a gap against the outer wall 7 of the second pipe 3. The axial width of the projection 15 and the axial lengths L1 and L2 of the hook-shaped retaining element 12 and of the spacer 13, respectively, are dimensioned in such a manner that, in the assembled arrangement of the pipe connection or fluid line connection 1, the securing device 8 is arranged on the outer wall 7 of the second pipe 3 in a manner tilted or clamped at an angle of approximately 9° to the axis running perpendicularly to the pipe axis. Customarily, an angle of smaller than 10° is preferred, the angle customarily lying between 5° and 10°. The axial width of the projection 15 here is greater than the amount of the difference between the axial lengths or extents L1 and L2. In the assembled position, the retaining element 12 engages behind the projection 15, with the spacer 13 ensuring that the securing device 8 is pre-clamped on the outer wall 7 of the second pipe 3. Should a tensile force now act on the pipe connection 1, the two pipes 2 and 3 would attempt to move away from each other. Owing to the pre-clamping of the internal contour 10 on the outer wall 7 of the second pipe 3, given such a movement, the securing device 8 can move away from the first pipe 12 only on the side of the spacer 13, but this leads to an increase in the clamping angle and therefore to an increase in the clamping or tilting on the second pipe 3 and therefore prevents movement of the second pipe 3. The design of the internal contour 11 of the passage opening 10 is of importance here so that said internal contour does not permit the second pipe 3 to slide out of the passage opening 10. The internal contour is therefore designed either as a sharp edge or as a frictional surface.

The projection 15 of the sleeve-shaped end section 5 does not absolutely have to be designed as a collar encircling the circumference. As an alternative, it is conceivable for the end section 5 to have two projections which are formed on radially opposite sides of the end section 5 and are arranged in a manner corresponding to the arrangement of the retaining element 12 and spacer 13. All that is of importance here is for the spacer to be able to be supported on the first pipe 2 and for the retaining element 12 to be able to be brought into engagement with the first pipe 2 in order to prevent the two pipes 2 and 3 from sliding apart.

The effect achieved by the oblique position of the securing device 8 in the fitted state or in the assembled position of the pipe connection 1 is that the internal contour 11 of the clamping body 9 is tilted on the second pipe 3, i.e. the securing device 8 has a certain degree of pre-clamping if a tensile force does not act on the pipe connection 1. Said pre-clamping has the effect that the securing device 8 is tilted ever further during any sliding apart of the pipe connection 1 and therefore ultimately a type of self-locking occurs which produces a resistance, which is caused by friction, to a slipping or rotation of the outer wall 7 of the second pipe 3, which outer wall bears against the internal contour 11. Said self-locking is influenced by the angle of the clamping or tilting, the surface roughness of the internal contour 11 and the material pairing of the securing device 8 and pipe 3.

The pipes 2 and 3 are customarily pipes made of plastic, and therefore, given a sharp-edged design of the internal contour 11 of the passage opening 10, the securing device 8 can easily cut into the plastics material of the pipes 2 and 3 during the clamping thereof and therefore the clamping action is increased. This applies in the event of a metallic design of the securing device 8.

In the event of the securing device 8' or 8" being produced from a plastics material, the internal contour 11 of the passage opening 10, which internal contour is designed as a frictional surface, ensures the necessary clamping in the event of the two pipes moving apart under the action of a tensile force. In order to ensure the clamping of the securing device 8' in this case, the clamping body 9 has the web 14 encircling radially on the outside and increasing the stability of the securing device 8' which is composed of plastic. As a result, the securing device 8', 8" or the clamping body 9 on the outer wall 7 of the second pipe 3 is prevented from folding over or rolling off in the event of a tensile force acting on the pipe connection 1. It should be taken into consideration that metal pipes are used at high exhaust gas temperatures, and therefore use of securing devices made from plastic should be dispensed with since said securing devices would soften under the effect of temperature. As a result, there would be the risk that the securing device made of plastic would not be sufficiently supported on a metal surface of the pipe and could slide off due to the lack of stiction. Therefore, a metallic design of the securing device is preferred at high exhaust gas temperatures.

It is possible by means of the above-described invention for an axial pipe connection which is strong in tension to be able to take place in a time-saving manner by hand without the use of a tool. In this type of pipe connection, the fitter does not have any influence on the functionality of the pipe connection since clamping screws, clips and the like do not have to be tightened. Furthermore, the pipe connection according to the invention permits simple visual checking of the correct installation of the securing device.

Although, in the exemplary embodiment of FIGS. 1 and 5 to 8, the securing device 8 of the first embodiment is used, it goes without saying that the pipe connection may also have the securing device 8' according to the second embodiment in order to realize an axial connection strong in tension between the first and second pipes.

The invention claimed is:

1. A socket joint which includes a first fluid conduit with a sleeve-shaped end section, a second fluid conduit with an end section designed as a pointed end, and a securing device,
   wherein the end section of the second conduit is insertable into the sleeve-shaped end section of the first conduit member, and the sleeve-shaped end section of the first conduit member has at its front end at least one projection having a section which is of collar shape,
   wherein the securing device includes a clamping body which is of annular design, with an opening which has an internal contour matched to the external diameter of the second conduit member for insertion of the second conduit member,
   wherein in the assembled condition of the socket joint, the end section of the second conduit member is inserted into the end section of the first conduit member and the securing device is slid over the external wall of the second conduit member and is disposed in the vicinity of the sleeve-shaped end section of the first conduit member,
   wherein formed on the annular clamping body there is at least one hook-shaped retaining element extending in the axial direction for engaging behind the collar-shaped section of the projection on the end section of the first fluid conduit member, wherein the at least one retaining element engages behind the collar-shaped section of the projection in the assembled position of the socket joint, such that the annular clamping body engages the external wall of the second fluid conduit member in a form-fitting manner canted in a skewed or oblique position differing from a position directed perpendicular to the axial direction, wherein formed on the clamping body there is at least one web-shaped spacer, which extends in the axial direction and, in the assembled position of the socket joint, supports the projection on the sleeve-shaped end section of the first fluid conduit member, wherein the at least one retaining element and the at least one spacer extend in the same axial direction, and wherein the axial width of the collar-shaped section of the projection is greater than the amount of the difference in the axial lengths of the at least one retaining element and the at least one spacer.

2. The socket joint of claim 1, wherein the internal contour of the opening is sharp edged or constructed as a friction surface.

3. The socket joint of claim 1, wherein the at least one spacer is formed substantially on the side of the clamping body radially opposite to the at least one retaining element.

4. The socket joint of claim 1, wherein the axial length of the at least one hook-shaped retaining element is greater than the axial length of the at least one web-shaped spacer.

5. The socket joint of claim 1, wherein in the assembled condition of the socket joint, the securing device is disposed canted to the second conduit member on its external wall at an angle of between 5° and 10° to the axis extending perpendicularly to the axial direction of the socket joint.

* * * * *